United States Patent [19]

Matsumoto et al.

[11] 4,105,936
[45] Aug. 8, 1978

[54] VARIABLE SPEED TAPE TRANSPORT APPARATUS

[75] Inventors: Isao Matsumoto, Tokyo; Haruhisa Yamaguchi, Atsugi, both of Japan

[73] Assignee: Sony Corporation, Tokyo, Japan

[21] Appl. No.: 686,077

[22] Filed: May 13, 1976

[51] Int. Cl.² .............................................. H02P 1/04
[52] U.S. Cl. ................................. 318/328; 318/398; 318/464
[58] Field of Search ................ 360/132; 318/328, 388, 318/397, 398, 463, 464; 361/240, 242, 243

[56] References Cited

U.S. PATENT DOCUMENTS

| 3,609,494 | 9/1971 | Takahashi et al. | 318/328 |
| 3,684,298 | 8/1972 | Ban | 360/132 |

*Primary Examiner*—Robert K. Schaefer
*Assistant Examiner*—Michael K. Mutter
*Attorney, Agent, or Firm*—Lewis H. Eslinger; Alvin Sinderbrand

[57] ABSTRACT

A variable speed tape transport apparatus for a tape cassette wherein the tape is driven at a selected one of plural predetermined speeds. The cassette includes speed indications thereon, each indication representing a respective normal tape speed. These indications are sensed by a sensor which, in turn, controls a control circuit for the tape drive motor such that the tape is selectively driven at a normal relatively lower speed or at a normal relatively higher speed. In addition, a selector mechanism, such as a fast-forward or rewind mechanism, is provided to enable the tape to be driven at a fast speed, this fast speed being at least equal to the relatively higher normal speed.

In one embodiment, a tape cassette to be driven at the relatively lower normal speed can be selectively driven at a first higher speed, equal to the relatively higher normal speed, and at a second even higher speed. In this embodiment, a cassette to be driven at the relatively higher normal speed can be selectively driven at the second higher speed.

11 Claims, 8 Drawing Figures

VARIABLE SPEED TAPE TRANSPORT APPARATUS

BACKGROUND OF THE INVENTION

This invention relates to tape transport apparatus and, more particularly, to a variable speed tape transport apparatus wherein tape can be transported at a first normal speed or at a second, higher normal speed and, moreover, the tape can be selectively transported at a fast speed which is at least equal to the higher normal speed.

In conventional tape recording devices, it is known that tape generally is transported at a relatively lower speed past a record/playback head to permit information to be recorded on and played back from the tape. In the event that the tape is to be rewound or advanced to a selected position therealong, the tape preferably is transported at a relatively higher speed. With the advent of the tape cassette wherein tape is housed in a cartridge and is adapted to be transported past apertures in the cassette housing from, for example, a supply reel to a takeup reel, the tape recording and playback apparatus is provided with controls to selectively attain normal forward motion of the tape, rapid rewind motion of the tape and fast-forward motion of the tape, all within the cassette housing.

In general, the quality of sound recorded on magnetic tape is, to a large extent, related to the transport speed of the tape. That is, there is a lower tape speed limit below which the fidelity of reproduced sound is degraded. This means that, in the manufacture and construction of a tape cassette, the amount of tape, or recording time, of the cassette should be balanced with the desired quality of the reproduced sound. This characteristic is of particular importance in portable cassette recording machines. In such machines, it is desirable to maximize the recording time capacity of each cassette, while minimizing the size of both the cassette and recording apparatus.

The foregoing considerations have resulted in various standardized criteria in the design of tape cassettes and cassette recording apparatus. That is, tape transport systems used in many cassette recording devices are adapted to transport the tape at a given normal speed which permits a relatively high quality of sound reproduction. This tape speed for the reproduction of sound from pre-recorded cassettes is, of course, equal to the tape speed used during the recording process. Of course, for cassette recording devices which are capable of recording audio information on tape, the same tape speed is used both for recording and playback operations. However, in some instances, it is desirable to use the cassette recording apparatus in certain situations wherein high fidelity sound reproduction is not as important as increasing the recording capacity. In these situations, it is preferred to transport the tape at a relatively lower speed for sound recording and reproduction. Conversely, in other situations wherein the quality of reproduced sound is more important than the recording capacity, it is preferred to transport the tape at a relatively higher speed during sound recording and reproduction.

Accordingly, it is one object of this invention to provide a variable speed tape transport apparatus wherein tape can be transported for sound recording and reproduction at a selected one of plural tape speeds. Where such a tape transport apparatus is to be used in, for example, a portable recording/playback device, the tape transport apparatus should be of relatively simple construction.

Also, where the tape transport apparatus is to be used with, for example, tape cassettes having a uniform outward appearance, it is preferred to provide soem indication of the tape speed which was used for recording. This, of course, is helpful in selecting the playback speed which must be equal to the recording speed for intelligible reproduction. Although such indications may be of the type that is sufficient to apprise an operator of the recording/playback apparatus, it is preferable to provide for the automatic sensing of such indications so that the appropriate tape speed may be automatically selected. This avoids possible confusion and erroneous operation of the recording/playback apparatus for the operator.

OBJECTS OF THE INVENTION

Therefore, it is one object of the present invention to provide a variable speed tape transport apparatus for transporting tape at any one of plural selectable speeds, as aforesaid.

Another object of this invention is to provide an improved variable speed tape transport apparatus for transporting tape at a selectable normal speed for recording and reproduction, the apparatus being of simplified construction.

Yet another object of this invention is to provide a variable speed tape transport apparatus wherein the normal tape speed used for recording and reproduction is automatically determined.

Another object of this invention is to provide an improved variable speed tape transport apparatus for use in a tape cassette recording/playback device wherein the normal tape speed is selected in accordance with predetermined speed indications provided on the cassette.

A further object of this invention is to provide an improved tape transport apparatus capable of transporting tape at a relatively lower normal speed or at a relatively higher normal speed for sound recording and reproduction, and wherein tape can be rewound or driven in a fast forward direction at a speed which is at least equal to the relatively higher normal speed.

Various other objects and advantages of the present invention will become apparent from the ensuing detailed description, and the novel features will be particularly pointed out in the appended claims.

SUMMARY OF THE INVENTION

In accordance with this invention, a variable speed tape transport apparatus is provided for transporting tape in a cassette at a selectable normal speed which can be used for sound recording and reproduction, the apparatus including a variable speed motor for driving the tape, a sensor for sensing predetermined speed indications on the tape cassette, each indication representing a particular normal tape speed, a control circuit coupled to the sensor for producing a motor speed control signal as a function of the sensed speed indications, whereby the motor is driven at a relatively lower speed when a first indication is sensed and at least one relatively higher speed when a second indication is sensed, and a manually operable selector coupled to the control circuit to vary the control signal such that the motor drives the tape at, for example, a higher rewind or fast forward speed which is at least equal to the speed determined in response to the second indication.

BRIEF DESCRIPTION OF THE DRAWINGS

The following detailed description, given by way of example, will best be understood in conjunction with the accompanying drawings in which.

DETAILED DESCRIPTION OF SOME OF THE PREFERRED EMBODIMENTS

Figure 1:
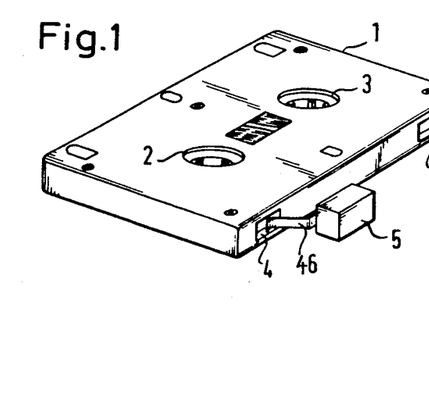
FIG. 1 is a perspective view of a typical tape cassette and a sensor used therewith to sense predetermined speed indications on the cassette.

Referring now to the drawings, wherein like reference numerals are used throughout, the present invention will be described in conjunction with a magnetic tape cassette. A typical tape cassette is shown in FIG. 1 wherein cassette 1 is provided with a substantially rectangular housing within which the tape is stored in individually rotatable reels, such as a supply reel and a take-up reel, and is movable therebetween in forward and reverse directions. Hence, cassette 1 includes apertures 2 and 3 adapted to receive tape driving spindles, as well as additional apertures (not shown) provided in a longitudinal edge of the cassette and through which various operating elements, such as a record/playback head and a pressure roller, are adapted to project. Hence, as tape is transported between, for eample, the supply reel and the take-up reel, audio signals can be recorded on or reproduced from the tape.

Cassette 1 also is provided with speed indications thereon which, when sensed, are used to determine the normal speed of the tape, that is, the speed at which audio information is recorded and reproduced. As shown in FIG. 1, these indications are the selective presence or absence of apertures 4 in the longitudinal edge wall of the cassette. Typically, apertures 4 are provided, or filled in, with a flap, or tab, which heretofore has been determinative of whether information can be recorded on the cassette or whether the recording process is inhibited. Typically, in the absence of an aperture, that is, when a flap is provided, the cassette recording apparatus is conditioned such that a recording operation can be performed, if desired. Hence, when a "RECORD" selector switch is operated, new audio information is recorded, and previously recorded information, if any, is erased. However, if the flaps are removed, that is, if apertures 4 are provided, the "RECORD" selector switch cannot be operated. Thus, previously recorded information is, essentially, permanently stored, and cassette 1 can be used for sound reproduction only.

Generally, prerecorded cassettes which are to be used for sound reproduction only are prerecorded at a predetermined tape speed. Hence, when such a cassette is used, the tape therein should be transported at the same speed as that which had been used for recording. However, when a "blank" cassette is used, that is, a cassette upon which audio information has not been prerecorded, the tape can be transported at any desired speed for recording and, of course, at that same speed for reproduction. Typically, prerecorded cassettes are provided with apertures 4 and "blank" cassettes are provided without such apertures, that is, the apertures are "filled" with flaps. Accordingly, the tape transport apparatus of this invention takes apertures 4 into account such that a first normal tape speed, for example, a relatively lower normal tape speed, is determined when an aperture is sensed and a second tape speed, for example, a relatively higher normal tape speed, is determined when aperture 4 is not sensed.

As shown in FIG. 1, a suitable sensor 5 is provided with a sensing element 46 adapted to extend into aperture 4 on cassette 1. Element 46 is resilient such that it will be blocked from entering aperture 4 in the event that a flap is provided over the aperture. Typically, sensor 5 includes a switch which is opened when element 46 extends into aperture 4 and is closed when element 46 cannot enter into the aperture. Thus, for the purpose of the present description, a relatively lower tape speed is determined when the switch in sensor 5 is opened and a relatively higher tape speed is determined when that switch is closed.

Figure 2:
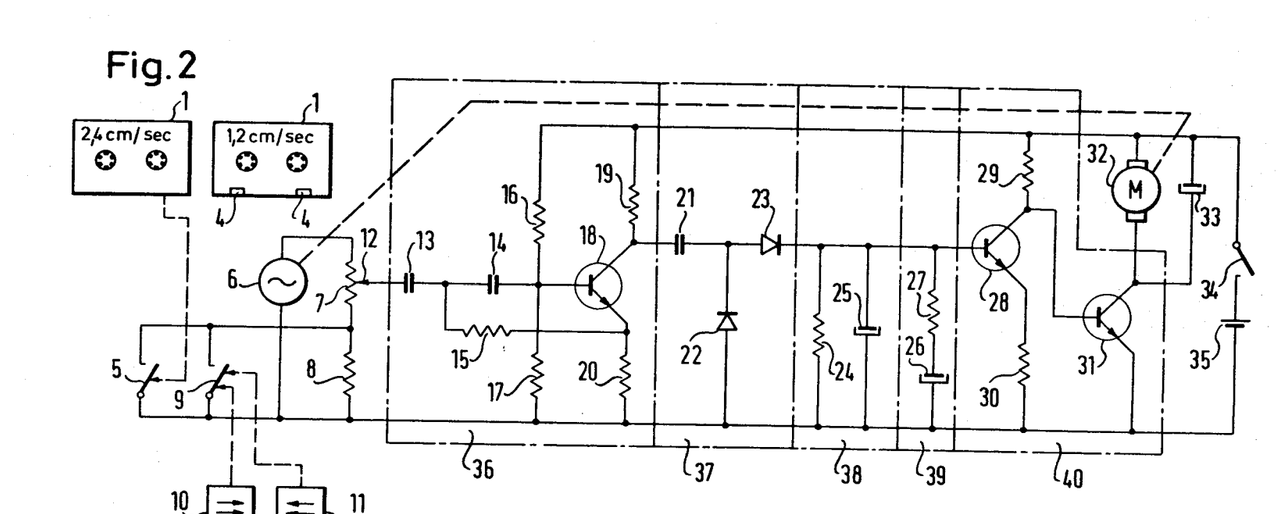
FIG. 2 is a schematic diagram of one embodiment of the variable speed tape transport apparatus.

The manner in which sensor 5 is used in conjunction with the variable speed tape transport apparatus of this invention is schematically depicted in FIG. 2. As one numerical example, it will be assumed that tape included in cassette 1 is to be transported at a relatively lower normal tape speed of 1.2 cm per second when an aperture 4 is provided and is to be driven at a relatively higher normal tape speed of 2.4 cm per second in the absence of aperture 4. Of course, as is appreciated, other normal tape speeds can be used, if desired. A motor 32, for example, a variable speed DC motor, is mechanically coupled to tape driving spindles, not shown, which are adapted to rotate the tape reels included in cassette 1 so as to correspondingly drive the tape bidirectionally within the cassette housing. A motor speed control circuit is provided to control the rotating speed of motor 32 such that the tape is transported at a substantially constant selected speed. The motor control circuit is comprised of a high-pass filter 36, a rectifier 37, a filter 38, a phase compensator 39 and a motor drive circuit 40, all connected in cascade. As shown, motor 32 is mechanically connected to an oscillating voltage generator 6 which is adapted to produce a voltage having a magnitude and frequency proportional to the rotary speed of motor 32. This oscillating voltage generated by generator 6 is applied across series-connected resistors 7 and 8, wherein resistor 7 is an adjustable resistor, such as a potentiometer, the series resistors thus forming a voltage divider. A movable tap 12 of potentiometer 7 is connected to filter 36.

Filter 36 is an active filter exhibiting band-pass or, alternatively, high-pass characteristics. Accordingly, filter 36 is comprised of a transistor 18 whose base electrode is biased by bias resistors 16 and 17, the base electrode being additionally connected to tap 12 of potentiometer 7 via series-connected capacitors 13 and 14. Collector and emitter load resistors 19 and 20 are provided and, additionally, a resistor 15 connects the emitter electrode of transistor 18 to the junction defined by capacitors 13 and 14. Accordingly, filter 36 is adapted to have a voltage-frequency relation wherein frequencies above a predetermined level are adapted to be transmitted with minimum attenuation, frequencies below a lower threshold level are adapted to be substantially attenuated and frequencies between these threshold levels are adapted to be variably attenuated, the lower frequencies in this range being attenuated to a greater degree than the higher frequencies in this range. This portion of the voltage-frequency characteristic of filter 36 is graphically depicted in FIG. 4 wherein the lower frequency rolloff characteristic of the filter is within the predetermined frequency range, as will be explained in greater detail below.

The output of filter 36 is derived at the collector electrode of transistor 18 and is supplied to rectifier 37. Rectifier 37 is comprised of an input capacitor 21 which connects the collector electrode of transistor 18 to the cathode of a diode 22. The anode of diode 22 is connected to a reference potential and its cathode is connected through a diode 23 to the output of rectifier 37. Filter 38, such as a low-pass filter, is comprised of a resistor 24 connected in parallel with a capacitor 25, this parallel circuit being connected to the output of diode 23. Accordingly, it should be appreciated that rectifier 37 and filter 38 are adapted to produce a DC signal proportional to the magnitude of the signal transmitted by filter 36.

Phase compensator 39 is comprised of a resistor 27 connected in series with a capacitor 26. This series circuit is connected in parallel with capacitor 25 and is adapted to compensate the phase of the DC signal produced by the rectifier-filter combination. This compensated DC signal is applied to motor drive circuit 40 which is comprised of cascaded transistor amplifiers 28 and 31. More particularly, the base electrode of transistor 28 is supplied with the DC signal from phase compensator 39. The emitter electrode of the transistor is connected to the reference potential by an emitter resistor 30 and its collector electrode is connected to a source of operating potential by a collector resistor 29. Additionally, the collector electrode of transistor 28 is connected to the base electrode of transistor 31, this latter transistor having its collector-emitter circuit connected in series with motor 32.

A capacitor 33 is connected in parallel with motor 32 and is adapted to suppress interference. The source of operating potential is provided by a suitable power supply 35 connected in series with, for example, an ON/OFF switch 34. Thus, when switch 34 is closed, operating potential is supplied to the illustrated motor control circuit.

Referring again to the voltage divider circuit comprised of resistors 7 and 8 which form an input circuit to the motor control circuit, it is seen that resistor 8 is connected in parallel with a first switch 5 and with a second switch 9. Switch 5 is the switch included in the aperture sensor described above in respect to FIG. 1. As indicated by the broken line between cassette 1 and switch 5 in FIG. 2, this switch is adapted to be opened when an aperture 4 is sensed and is adapted to be closed in the absence of an aperture. When switch 5 is closed, resistor 8 is effectively short-circuited, thus increasing the voltage division, or attenuating level, of the oscillating voltage generated by generator 6 and applied to filter 36 by movable tap 12 of potentiometer 7.

Switch 9 is mechanically coupled to selector members 10 and 11, respectively. In one embodiment, selector member 10 is a fast-forward switch operable, when actuated, to initiate a fast-forward movement of the tape within cassette 1. Selector member 11 is a rewind switch operable, when actuated, to initiate a rewind movement of tape, the speed at which tape is rewound being equal to the fast-forward speed, as will be described.

Figure 3:
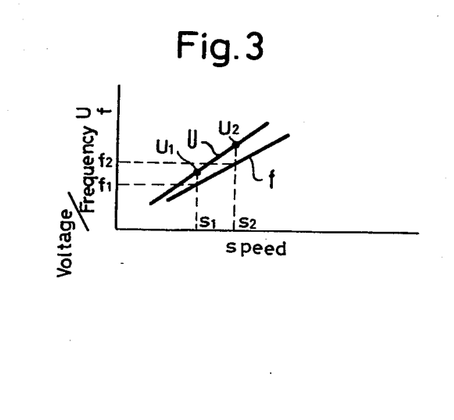
FIG. 3 is a graphical representation useful in describing the operation of the schematic diagram of FIG. 2.

In describing the operation of the illustrated tape transport apparatus, let it be assumed that a cassette 1 having apertures 4 is provided in the recording/reproducing apparatus. It is recalled that the apertures are speed indications representing that the tape is to be transported at a relatively lower normal speed for recording and reproducing purposes. Consistent with the above-assumed numerical example, this lower normal tape speed may be 1.2 cm per second. Aperture 4 is sensed, resulting in the opening of switch 5. Let it be assumed that neither fast-forward selector member 10 nor rewind selector member 11 is actuated. Hence, switch 9 also is opened. Therefore, when motor 32 rotates, the tape in cassette 1 is transported at the relatively lower normal speed, which speed is represented by the voltage generated by generator 6. A graphical representation of the amplitude and frequency of the voltage generated by generator 6 as a function of the rotary speed of motor 32 is depicted in FIG. 3. Thus, for the relatively lower normal tape speed $S_1$, generator 6 produces a voltage of amplitude $U_1$ and frequency $f_1$.

Figure 4:
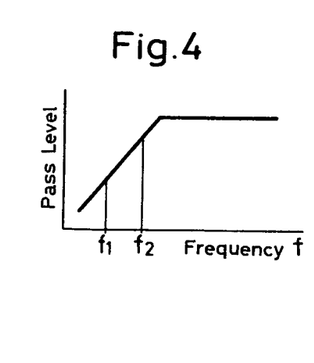
FIG. 4 is a graphical representation of a portion of the frequency characteristic of a filter used with the tape transport apparatus shown in FIG. 2.

After slight attenuation by resistors 7 and 8, the voltage generated by generator 6 is applied to filter 36. As shown in FIG. 4, frequency $f_1$ of voltage $U_1$ is disposed at the lower frequency rolloff portion of the filter characteristic of filter 36. Hence, because of this attenuating characteristic on voltages of frequency $f_1$ by filter 36, the speed-representing voltage generated by generator 6 is further attenuated. Then, after rectification in rectifier 37, filtering in filter 38 and compensation in phase compensator 39, a DC signal representing the speed of motor 32 is applied to motor drive circuit 40.

The illustrated motor control circuit functions as a servo circuit to control the speed of motor 32. If the motor speed increases, it is appreciated that the amplitude and frequency of the voltage generated by generator 6 likewise increases. This increase in frequency results in less attenuation of the voltage by filter 36, as is appreciated from FIG. 4. Hence, the DC voltage applied to transistor 28 of motor drive circuit 40 increases. This increase in voltage tends to increase the conductivity of transistor 28, thus decreasing the voltage at the collector electrode thereof. Hence, the base voltage of transistor 31 correspondingly decreases to thus increase the collector-emitter impedance thereof. Therefore, a reduced current flows from power supply 35, through closed switch 34 and through motor 32 and transistor 31. Consequently, the speed of motor 32 is properly reduced.

Conversely, if the speed of motor 32 falls, the amplitude and frequency of the voltage generated by voltage generator 6 are reduced correspondingly. As is apparent from the filter characteristics shown in FIG. 4, this lower frequency voltage is more highly attenuated by filter 36. Hence, the DC signal applied to transistor 28 in motor drive circuit 40 is reduced, resulting in an increase in the base voltage applied to transistor 31. Thus, the collector-emitter impedance of transistor 31 connected in series with motor 32 is reduced to thereby increase the current through the motor. Consequently, the motor speed is restored to its proper value.

If fast-forward selector member 10 or rewind selector member 11 is actuated, switch 9 is closed. This effectively short-circuits resistor 8. Hence, the voltage division of the voltage generated by generator 6 is determined by potentiometer 7 alone. This means that, for a given setting of the potentiometer, the closing of switch 9 results in a higher attenuation of the voltage generated by generator 6. Accordingly, a lower voltage is applied to and transmitted by filter 36 and a correspondingly lower DC voltage is applied to transistor 28 in motor drive circuit 40. Thus, the voltage applied to the base electrode of transistor 31 is increased to increase the current through motor 32, whereby the motor drives the tape at a higher speed. This higher tape speed is represented by a higher frequency such as $f_2$, and amplitude in the voltage generated by generator 6. However, potentiometer 7 provides greater attenuation, and this attenuated voltage is transmitted by filter 36 to stabilize the motor speed at the faster rewind or fast-forward speed. As will be described in greater detail below, selector members 10 and 11 are connected through suitable means, such as a mechanical transmission, to selectively determine the direction in which tape is transported at the fast-forward or rewind speed. Thus, it is seen that the illustrated motor control circuit is adapted to transport tape in cassette 1 at a normal speed, suitable for sound recording and reproduction, and at a higher fast-forward or rewind speed depending upon the selective actuation of members 10 and 11, respectively.

If it is assumed that the cassette placed in the recording/playback device is provided with no aperture 4, indicating a relatively higher normal tape speed, such as 2.4 cm per second, then switch 5 is closed. Consequently, resistor 8 is short-circuited and the attenuation of the voltage generated by generator 6 depends solely on the setting of potentiometer 7. As is recognized, this attenuation factor is increased, resulting in a lower voltage applied to and transmitted by filter 36 and a lower DC voltage applied to motor control circuit 40. Hence, in the now understood manner, the illustrated servo circuit drives motor 32 at a higher speed, for example, 2.4 cm per second.

In the embodiment shown in FIG. 2, when a cassette adapted to have the relatively higher normal tape speed is used, as indicated by the absence of apertures 4, the closing of switch 9 by the selective actuation of fast-forward selector member 10 or rewind selector member 11 has no effect upon the tape speed. This is because switch 9 is connected in parallel with switch 5, so that when switch 5 is closed, the operation of switch 9 has no effect upon the illustrated motor control circuit. However, as will be explained below, the input circuit comprised of resistors 7 and 8 can be modified such that the tape included in a cassette can be driven at a higher fast-forward or rewind speed even if that cassette is adapted to be driven at the relatively higher normal tape speed.

Figure 5:
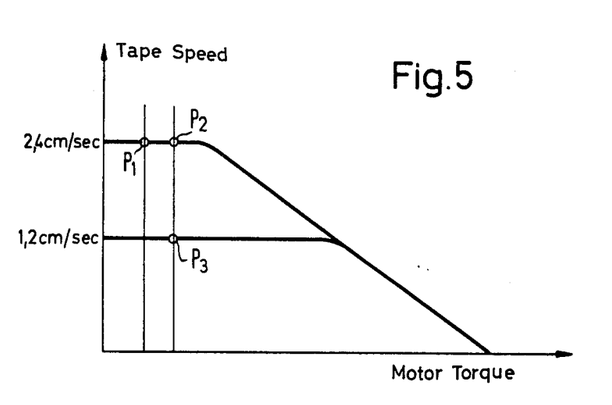
FIG. 5 is a graphical representation of the relationship between tape speed and motor torque.

A graphical representation of the relationship between tape speed and motor torque is shown in FIG. 5. Point $P_2$ represents the torque required for the relatively higher normal tape speed of 2.4 cm per second. Point $P_3$ represents the torque required for the relatively normal tape speed of 1.2 cm per second. Point $P_1$ represents the torque required for the fast-forward or rewind movement of tape which is adapted to be driven at the relatively lower tape speed of 1.2 cm per second, but has a fast-forward or rewind tape speed of 2.4 cm per second.

Figure 6:
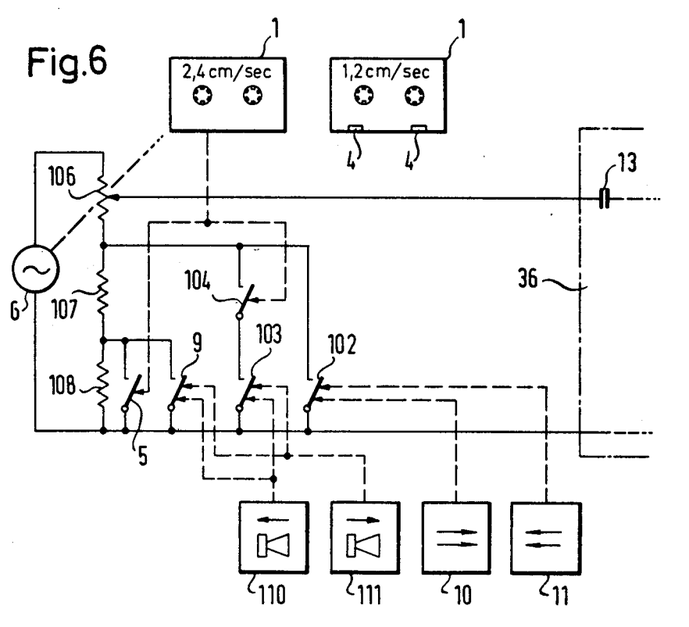
FIG. 6 is a schematic diagram of a portion of another embodiment of the variable speed tape transport apparatus.

Referring now to FIG. 6, there is illustrated another embodiment of tape transport apparatus wherein the input circuit to the motor control circuit described above in respect to FIG. 2 is modified. In the FIG. 6 embodiment, tape is adapted to be driven at a relatively lower normal speed, at a relatively higher normal speed and a fast-forward or rewind speed which is greater than the relatively higher normal speed. In accordance with the above-assumed numerical example, the FIG. 6 embodiment is capable of driving tape at a normal tape speed of 1.2 cm per second provided apertures 4 in cassette 1 are sensed. If these apertures are not sensed, the tape is adapted to be driven at a normal speed of 2.4 cm per second. Furthermore, in the embodiment of FIG. 6, the tape is adapted to be driven in the fast-forward or rewind directions at a speed of 4.8 cm per second, irrespective of the normal tape speed for that cassette. The FIG. 6 embodiment also is provided with a monitor speed capability. That is, tape is moved at a relatively fast speed past a playback head while audible sounds corresponding to such fast tape movement are produced. For the cassette having the relatively lower normal tape speed, the monitor speed is equal to the relatively higher normal tape speed. When a cassette having the relatively higher normal tape speed is used, the monitor speed is equal to the fast-forward or rewind speed.

Now described in greater detail, FIG. 6 shows the input circuit to the motor control circuit as being comprised of series-connected resistors 106, 107 and 108 formed as a voltage divider. Preferably, resistor 106 is a potentiometer whose movable tap is connected to filter 36, as shown. Aperture-sensor switch 5 is connected in parallel with the lower-most resistor 108 and is adapted, when closed, to short-circuit this resistor. As is appreciated, the attenuation of the voltage generated by generator 6 is increased when switch 5 is closed. That is, the voltage amplitude applied to filter 36 is reduced when switch 5 is closed. Similar to the FIG. 2 embodiment, switch 9 is connected in parallel with switch 5. Whereas switch 9 in FIG. 2 is closed in response to the selective actuation of fast-forward selector member 10 or rewind selector member 11, switch 9 in FIG. 6 is closed in response to the selective actuation of rewind monitor selector 110 or forward monitor selector 111.

A switch 102 is connected in parallel with series resistors 107 and 108. Switch 102 is adapted to be closed in response to the selective actuation of fast-forward selector member 10 or rewind selector member 11. Hence, switch 102 in FIG. 6 performs substantially the same function as switch 9 in FIG. 2.

Switches 104 and 103 are connected in parallel with switch 102. Switch 103 is included in the aperture sensor and, as indicated by the broken line, is ganged with switch 5 and is closed when no aperture is sensed. Switch 103 is ganged with switch 9 and, therefore, is adapted to be closed when either rewind monitor selector 110 or forward monitor selector 111 is actuated.

It is appreciated that, if a cassette 1 adapted to have the relatively lower normal tape speed is loaded into the recording/playback apparatus (not shown), switch 5 is opened. Hence, resistors 106, 107 and 108 are connected in series to present a minimal degree of attenuation to the voltage generated by generator 6. However, since this voltage has a low frequency, it is attenuated by filter 36 to apply a low-level DC signal to motor drive circuit 40. As described above, motor 32 is driven at a substantially constant rate so as to transport the tape in cassette 1 at the relatively lower normal speed of, for example, 1.2 cm per second.

If one of the forward or rewind monitor selectors 110, 111 is actuated, switches 9 and 103 are closed. Since switch 104 has been assumed to be opened because of the presence of apertures 4, the closing of switch 103 has no effect upon the speed of motor 32. However, by closing switch 9, resistor 108 is removed from the voltage divider circuit connected to generator 6. Consequently, the degree of attenuation presented to the voltage generated by generator 6 is increased. This means that the voltage now applied to filter 36 is reduced. Accordingly, the level of the DC signal applied to motor drive circuit 40 is correspondingly reduced to thereby increase the current through motor 32. As a result thereof, motor 32 is driven at a higher speed which, in turn, transports the tape in cassette 1 at a similarly higher speed. As a numerical example, this higher speed is stabilized at 2.4 cm per second when one of the forward or rewind monitor selectors 110 and 111 is actuated for the case wherein a cassette having a normal tape speed of 1.2 cm per second is used.

Now, if one of the fast-forward or rewind selector members 10, 11 is actuated, switch 102 is closed to effectively short-circuit resistors 107 and 108. Thus, the voltage dividing ratio presented to generator 6 is determined solely by resistor 106. This means that the voltage generated by generator 6 is further attenuated to supply a lower amplitude voltage signal to filter 36. Accordingly, the DC voltage applied to motor drive circuit 40 is further reduced, resulting in an increased current through motor 32. Therefore, tape in cassette 1 is driven at the fast-forward or rewind speed of 4.8 cm per second.

If it is assumed that a cassette exhibiting the relatively higher normal tape speed is used, then the absence of apertures 4 is detected and switches 5 and 104 are closed. It is appreciated that, by closing switch 5, resistor 108 is short-circuited such that the tape is driven at the relatively higher normal tape speed of 2.4 cm per second. This, of course, corresponds to the forward or rewind monitor speed for a cassette having apertures 4, as discussed above.

If one of the forward or rewind monitor selectors 110, 111 is actuated, switches 9 and 103 are closed. It is appreciated that, since switch 9 is in parallel with switch 5, and since switch 5 is closed, the additional closing of switch 9 has no effect upon the illustrated apparatus. However, the closing of switch 103, in combination with closed switch 104, results in the short-circuiting of resistors 107 and 108. Hence, the voltage division of the voltage generated by generator 6 now is determined solely by a potentiometer 106 and, therefore, this voltage is substantially attenuated. Accordingly, it is appreciated that the DC voltage applied to motor drive circuit 40 is correspondingly reduced, resulting in a greater current through motor 32. Thus, the tape in cassette 1 is driven at a forward or rewind monitor speed of 4.8 cm per second. It is appreciated that this is equal to the fast-forward or rewind speed and, as indicated, tape is transported at this speed if fast-forward or rewind selector members 10 or 11 are actuated. That is, for the case wherein cassette 1 exhibits the relatively higher normal tape speed of 2.4 cm per second, the forward or rewind monitor speed and the fast-forward or rewind speed of this tape all are equal to 4.8 cm per second.

Therefore, it is seen that the embodiments of the tape transport apparatus illustrated in FIGS. 2 and 6 are capable of selectively driving tape in cassette 1 at a relatively lower normal tape speed or at a relatively higher normal tape speed, suitable for signal recording and reproduction, depending upon the selective presence or absence of apertures 4. In the FIG. 2 embodiment, the relatively higher normal tape speed corresponds to the fast-forward or rewind tape speed for the cassette which exhibits the relatively lower normal tape speed. In the FIG. 6 embodiment, the fast-forward or rewind speed for either cassette is greater than the relatively higher normal tape speed. Thus, as shown, the rewind or fast-forward tape speed in the illustrated embodiment is at least equal to the relatively higher normal tape speed.

Figure 7:
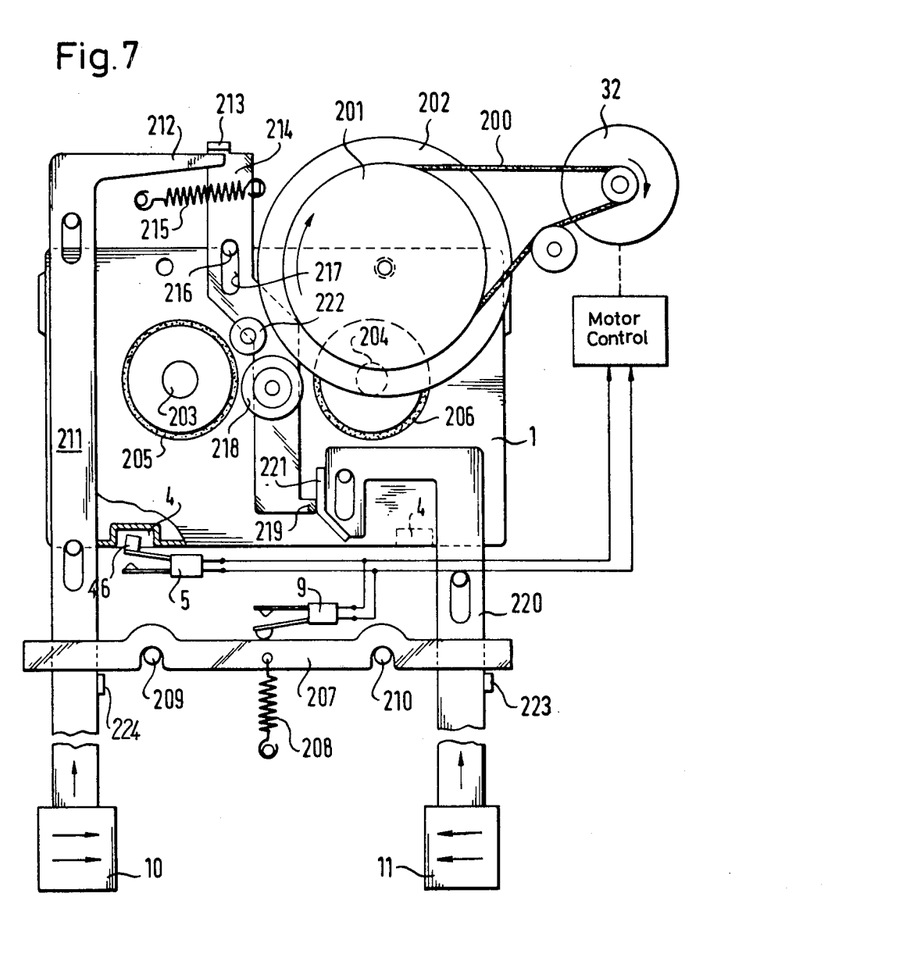
FIGS. 7 and 8 are sectional views showing a portion of the mechanical elements used in the variable speed tape transport apparatus.
Figure 8:
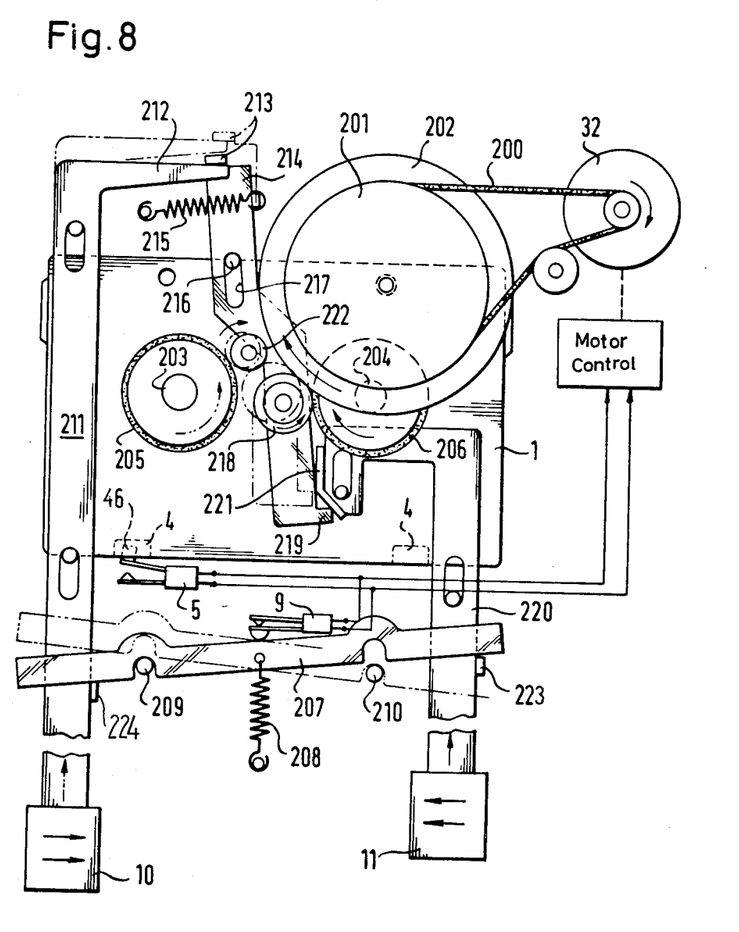

One embodiment of the manner in which selector members 10 and 11 operate to close switches 9 (FIG. 2) or 102 (FIG. 6) is illustrated in FIGS. 7 and 8. Motor 32 is coupled via drive belt 200 to a flywheel 201 provided with a friction collar 202. In one embodiment wherein the tape in cassette 1 is adapted to be capstan-driven for signal recording and reproduction, the capstan is adapted to be secured to flywheel 201. Tape drive spindles 203 and 204, adapted to be inserted into apertures 2 and 3 of cassette 1 (FIG. 1) are provided with friction wheels 205 and 206, respectively. An idler wheel 218 is supported on lever 214, the lever being pivoted about a pivot pin 216 secured to, for example, a chassis (not shown) or other suitable support element, and a spring 215 biases lever 214 in the counterclockwise direction about pivot pin 216. A nose 219 of lever 214 is adapted to abut against an angled slide surface 221 provided on the end of an L-shaped member 220. As shown in FIG. 7, the abutment of nose 219 on lever 214 against slide surface 221 prevents lever 214 from pivoting about pivot pin 216.

L-shaped lever 220 is secured to selector member 11 and is adapted to slide in the direction indicated by the arrow in response to suitable operation of the selector member. A projection 223 extending upward from L-shaped lever 220 is adapted to contact a lever 207 when selector member 11 is actuated. Lever 207 is urged by a spring 208 against stops 209, 210. As shown, spring 208 is secured to the central portion of lever 207 and stops 209, 210 are displaced from the spring. As will be explained below, stops 209 and 210 function as respective pivot axes for lever 207.

Projection 223 is adapted to pivot lever 207 about stop 209 when selector member 11 is actuated. A similar projection 224 provided on L-shaped lever 211 is adapted to pivot lever 207 about stop 210 when selector member 10, secured to L-shaped lever 211, is actuated. This selective pivoting of lever 207 is shown in FIG. 8. A leg 212 of L-shaped lever 211 is adapted to abut against lug 213 provided at the end of lever 214 opposite the end whereat nose 219 is situated. When L-shaped lever 211 slides in the direction indicated by the arrow in response to actuation of selector member 10, leg 212 abuts against lug 213 to drive lever 214 upward, as indicated in broken lines in FIG. 8. In this configuration, idler wheel 218 is urged against friction collar 202 of flywheel 201 and, additionally, against an idler wheel 222. Idler wheel 222 is spring-biased to the chassis (not shown) or other suitable support member such that when idler wheel 218 is urged thereagainst, idler wheel 222 is driven into frictional contact with friction wheel 205 on drive spindle 203.

Conversely, when L-shaped lever 220 is urged in the direction indicated by the arrow, slide surface 221 is moved upwardly to the position shown in FIG. 8, thereby removing the abutting obstacle against nose 219 of lever 214. Hence, lever 214 pivots in the counterclockwise direction about pivot pin 216 because of the spring bias force urged thereon by spring 215. This, in turn, drives idler wheel 218 simultaneously against friction collar 202 of flywheel 201 and friction wheel 206 of drive spindle 204.

Switch 9, described hereinabove in respect to the embodiments shown in FIGS. 2 and 6, includes movable contacts adjacent the central, or intermediate portion of lever 207. Thus, when lever 207 is pivoted about stop 209 or about stop 210, the central portion thereof urges the contact of switch 9 to close. As shown in FIGS. 7 and 8, switch 9 is electrically connected in parallel with switch 5, these switches being coupled to the motor control circuit. Switch 5 is seen to be substantially similar to the sensor switch shown and described hereinabove in respect to FIG. 1.

In operation, if fast-forward selector member 10 is actuated, L-shaped lever 211 is urged in the direction indicated by the arrow such that projection 224 thereon pivots lever 207 about stop 210. This, of course, closes switch 9. In addition, lever 214 is driven upwardly by leg 212 to urge idler wheel 218 against friction collar 202 of flywheel 201 and idler wheel 222, the latter being urged against friction wheel 205 of drive spindle 203. Thus, motor 32 is driven at the fast-forward speed to drive flywheel 201, idler wheel 218, idler wheel 222 and friction wheel 205 at the corresponding fast-forward speed. Hence, drive spindle 203 is driven to transport the tape in cassette 1 at the fast-forward speed.

If rewind selector member 11 is actuated, L-shaped lever 220 moves in the direction indicated by the arrow such that projection 223 pivots lever 207 about stop 209. This closes switch 9 and, in addition, slide surface 221 is effectively removed from nose 219 of lever 214. This permits lever 214 to pivot in the counterclockwise direction about pivot pin 216, thereby urging idler wheel 218 against friction collar 202 of flywheel 201 and friction wheel 206 of drive spindle 204. Hence, motor 32 is driven at the rewind speed to, in turn, drive flywheel 201, idler wheel 218 and friction wheel 206. Hence, the tape in cassette 1 is driven in the rewind direction at the rewind speed.

While the present invention has been particularly shown and described with reference to preferred embodiments thereof, it should be readily understood that various changes and modifications in form and details can be made by one of ordinary skill in the art without departing from the spirit and scope of the invention. For example, although FIGS. 2 and 6 suggest the use of two normal tape speeds for the recording and reproduction of information, it is apparent that the teachings of the present invention apply equally to three or more normal tape speeds. Similarly, depending upon whether a speed indication sensor switch is closed, switches 9 (FIG. 2) or 102 (FIG. 6) may be suitably connected such that two or more fast-forward or rewind tape speeds may be used. As another alternative, instead of selectively changing the attenuation level of the voltage generated by generator 6 in response to the selective closing of the illustrated switches, the output of generator 6 can be connected to the motor control circuit through a suitable variable gain amplifier, the gain being selectively determined by the closure of such switches. Therefore, it is intended that the appended claims be interpreted as including the foregoing as well as various other such changes and modifications.

What is claimed is:

1. A variable speed tape transport apparatus for transporting tape in a cassette at a substantially constant speed, said speed being selected from plural predetermined speeds, comprising:

a variable speed motor for driving said tape;

means responsive to the speed of said motor for generating a signal whose amplitude and frequency both are proportional to said speed so that the generated signal is within a frequency range corresponding to said plural predetermined speeds;

control means for producing a motor speed control signal as a function of said generated signal, said control means including filter means for receiving said generated signal and having a filter characteristic with a rolloff portion that at least encompasses said frequency range of said generated signal to selectively attenuate the amplitude of said generated signal, the attenuation being inversely related to the frequency of said generated signal, said control signal being derived from said selectively attenuated generated signal;

sensing means coupled to said cassette for sensing predetermined speed indications on said cassette, each said indication representing a respective normal tape speed;

level determining means for supplying a selectable level of said generated signal to said filter means;

switch means actuable in response to the speed indications sensed by said sensing means for controlling said level determining means to determine the level of said generated signal supplied to said filter means, such that said generated signal is supplied to said filter means at a first level in response to a first sensed speed indication whereby said motor is driven at a relatively lower normal speed and said generated signal is supplied to said filter means at a second level in response to at least a second sensed speed indication whereby said motor is driven at at least one relatively higher normal speed; and selector means coupled to said control means and operable to vary said control signal to drive said motor at a fast speed at least equal to said relatively higher normal speed.

2. The apparatus of claim 1 wherein said level determining means comprises a voltage divider formed of at least two series-connected impedance elements for receiving said generated signal; and said switch means includes at least one switch connected in parallel with a corresponding one of said impedance elements, said one switch being selectively closed to short-circuit said one impedance element in response to a predetermined sensed speed indication.

3. The apparatus of claim 1 wherein said selector means comprises at least one selector switch connected in parallel to said switch means.

4. The apparatus of claim 3 wherein said control means further includes a motor drive circuit responsive to said attenuated generated signal for supplying said motor speed control signal to said motor.

5. The apparatus of claim 4 wherein said level determining means includes a variable attenuator, and said switch means comprises a first switch to increase the attenuation level of said attenuator by a first amount when said first switch is closed and a second switch ganged with said first switch; and wherein said selector means comprises a third switch connected in parallel with said first switch to increase said attenuation level by said first amount when said third switch is closed, a fourth switch ganged with said third switch and connected in series with said second switch to increase said attenuation level by a second amount when both said second and fourth switches are closed, and a fifth switch connected in parallel with said series-connected second and fourth switches to increase said attenuation level by said second amount when said fifth switch is closed; whereby said motor drives said tape at a relatively lower normal speed when said first switch is opened, at a higher speed when said fifth switch is closed and at an intermediate speed when said third switch is closed, and said motor drives said tape at a normal speed equal to said intermediate speed when said first switch is closed.

6. The apparatus of claim 4 wherein said means for generating a signal comprises an oscillating voltage generator for generating a voltage having magnitude and frequency determined by said speed of said motor.

7. The apparatus of claim 6 wherein said motor drive circuit comprises a rectifier circuit coupled to said filter means and an amplifier coupled to said rectifier circuit for applying a driving current to said motor as a function of the magnitude of the voltage applied to said rectifier circuit.

8. The apparatus of claim 3 wherein said predetermined speed indications comprises the selective presence or absence of an aperture at a predetermined location on said cassette, and said sensing means actuates said switch means to a first state when said aperture is present and to a second state when said aperture is absent, whereby said tape is driven at said relatively lower normal speed when said switch means is in said first state and at said relatively higher normal speed when said switch means is in said second state.

9. The apparatus of claim 8 wherein said selector means comprises a selector switch selectively operable to drive said motor at a fast speed at least equal to said higher normal speed.

10. The apparatus of claim 9 wherein said selector switch comprises a longitudinal member; first and second spaced apart stops defining first and second pivot points for said member, said pivot points being on opposite sides of an intermediate portion of said member, means for exerting a resilient force on said member to urge said member against said stops; switch contacts disposed adjacent said intermediate portion of said member; and first and second actuating means at opposite ends of said member to selectively pivot said member about said respective pivot points, whereby said intermediate portion of said member urges said switch contacts closed when said member pivots about either one of said pivot points.

11. A variable speed tape transport apparatus for transporting tape in a cassette at substantially constant speed, said speed being selected from plural predetermined speeds, comprising:

a variable speed motor for driving said tape;

means responsive to the speed of said motor for generating a signal whose amplitude and frequency both are proportional to said speed so that the generated signal is within a frequency range corresponding to said plural predetermined speeds;

control means for producing a motor speed control signal as a function of said generated signal, said control means including a high-pass filter for receiving said generated signal and having a filter characteristic with a rolloff portion that at least encompasses said frequency range of said generated signal to selectively attenuate the amplitude of said generated signal as an inverse function of the frequency thereof, said control signal being derived from said selectively attenuated generated signal;

sensing means coupled to said cassette for sensing predetermined speed indications on said cassette, each said indication representing a respective normal tape speed;

level determining means for supplying a selectable level of said generated signal to said filter means;

switch means actuable in response to the speed indications sensed by said sensing means for controlling said level determining means to determine the level of said generated signal supplied to said filter means, such that said generated signal is supplied to said filter means at a first level in response to a first sensed speed indication whereby said motor is driven at a relatively lower normal speed and said generated signal is supplied to said filter means at a second level in response to at least a second sensed speed indication whereby said motor is driven at at least one relatively higher normal speed; and selector means coupled to said control means and operable to vary said control signal to drive said motor at a fast speed at least equal to said relatively higher normal speed.

* * * * *